United States Patent [11] 3,613,015

[72] Inventors Harry W. Lewis
Norristown;
Edmund J. McBride, Upper Darby, both of Pa.; Sperry Rand Corporation, New York, N.Y.

[21] Appl. No. 875,887
[22] Filed Nov. 12, 1969
[45] Patented Oct. 12, 1971
[73] Assignee Sperry Rand Corporation, New York, N.Y.

[54] BINARY DIGITAL DATA DETECTION SYSTEM
4 Claims, 3 Drawing Figs.

[52] U.S. Cl. .......... 328/63, 178/69.5 R, 307/232, 307/269, 328/119
[51] Int. Cl. .......... H03k 1/00, H03k 5/00, H03k 13/00
[50] Field of Search .......... 307/208, 232, 233, 234, 269; 328/62, 63, 72, 74, 110, 119; 178/69.5 R; 340/174.1 A, 174.1 H

[56] References Cited
UNITED STATES PATENTS

| | | | |
|---|---|---|---|
| 3,196,358 | 7/1965 | Bagley | 307/208 X |
| 3,401,346 | 9/1968 | Brown et al. | 328/110 X |
| 3,491,303 | 1/1970 | Gindi | 328/119 X |
| 3,518,554 | 6/1970 | Gabor | 328/63 |

*Primary Examiner*—Stanley D. Miller, Jr.
*Attorneys*—Charles C. English, Sheldon Kapustin and William E. Cleaver

ABSTRACT: An improved strobe pulse generator system for self-clocking data systems wherein a resettable strobe pulse generator is prevented from resetting during a data pulse. The input data is applied to an AND gate the output of which is coupled to the strobe pulse generator to first set the strobe pulse and then after a delay to reset the strobe pulse generator. The reset coupling is through an inhibit gate which also receives the input data through an inverter. The inhibit gate and the inverter operate to prevent resetting the strobe pulse generator during the receipt of a data pulse.

Figure 1:
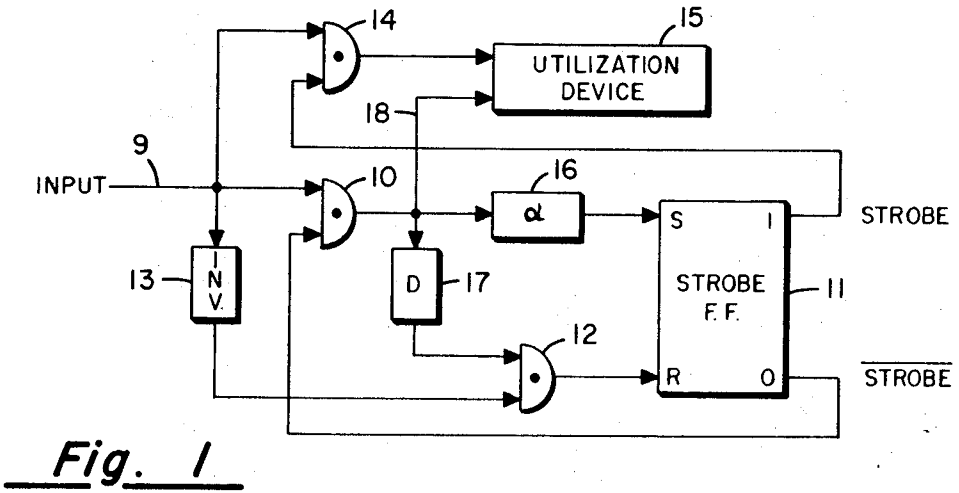

INVENTORS
HARRY W. LEWIS
EDMUND J. McBRIDE

BY Charles T. English
AGENT

BINARY DIGITAL DATA DETECTION SYSTEM

This invention relates to a digital data system and in particular to a circuit means for separating the clock and data pulses of a so-called "self-clocking" data system.

BACKGROUND OF THE INVENTION

Self-clocking-type pulse digital translation systems are now quite well known in the art. These systems are generally characterized by pulse patterns which are coded to provide both clock and data information in a single serial signal transmission. In such systems a means for separating the clock pulse information from the data pulse information is generally necessary to the decoding operation. One type of coding which is self-clocking in nature and which is finding increasing acceptance in the binary magnetic recording field is the so-called "double frequency" system. In this system a clock pulse is always recorded at the boundary or starting point of each data cell. To represent a binary "1" a second pulse is recorded at the center of the data cell, while a binary "0" is represented by the absence of a pulse in the center of a cell. To interpret the information thus recorded, the pulse at the start of the cell is detected and utilized to generate a strobe pulse which is normally timed to be centered about the center of the cell. Then by gating the recovered pulse signal train with the so-called "-strobe pulse" the binary content of the signal train can be decoded.

While such systems have been found to be quite satisfactory a problem of accurately and reliably controlling the generation of the strobe pulse has occurred. One such problem occurs where, for various reasons, the data pulse which represents a binary "1" shifts in time from its nominal center position to a point toward the end of the cell and in particular, where the data pulse may shift to a position where it straddles the trailing edge of the strobe pulse. In such a case, the circuit for decoding the information may err in that the data pulse may be misconstrued as the next successive clock pulse. In this case the generation of the next strobe and subsequent strobes thereafter is thrown off timing and the data being represented may be inverted in significance, i.e. clock pulses may be read as data pulses.

It is therefore a purpose of this invention to provide a logical circuit for more reliably separating clock and data pulses and for generating a strobe signal which reduces the occurrence of the above type of decoding errors.

SUMMARY OF THE INVENTION

Briefly in accordance with the teaching of the present invention, a logic system for separating clock pulses from data pulses is provided which comprises a two-input AND gate one input to which is connected to the incoming data line while the other input is connected to the output of the strobe pulse generator. The output of the two-input AND gate is in turn coupled through a coupling network to the set and reset inputs of the strobe pulse generator. The coupling path connected to the set input of the strobe pulse generator acts in delayed response to an output from the AND gate to initiate the generation of a strobe pulse while the coupling path connected to reset input acts in further delayed response to the output from the AND gate to terminate the generation of the strobe pulse. This reset coupling path includes an inhibit gate to which the incoming data line has been connected through an inverter. The operation of the inverter and the inhibit gate inhibits resetting the strobe generator during the occurrence of a data pulse. In this way a data pulse which has been shifted to a point where it straddles the normal end of the strobe pulse inhibits the reset of the strobe pulse generator until the end of the data pulse has occurred. In other words, the duration of the strobe may be prolonged whenever its termination may interfere with the proper decoding of the incoming data.

Figure 2:
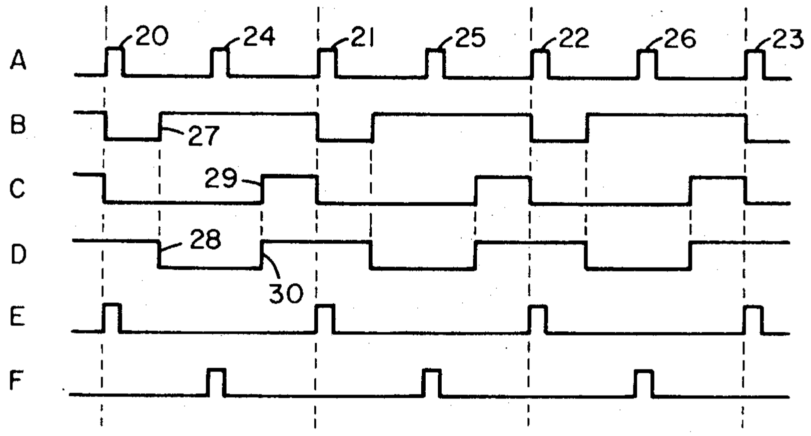
Figure 3:
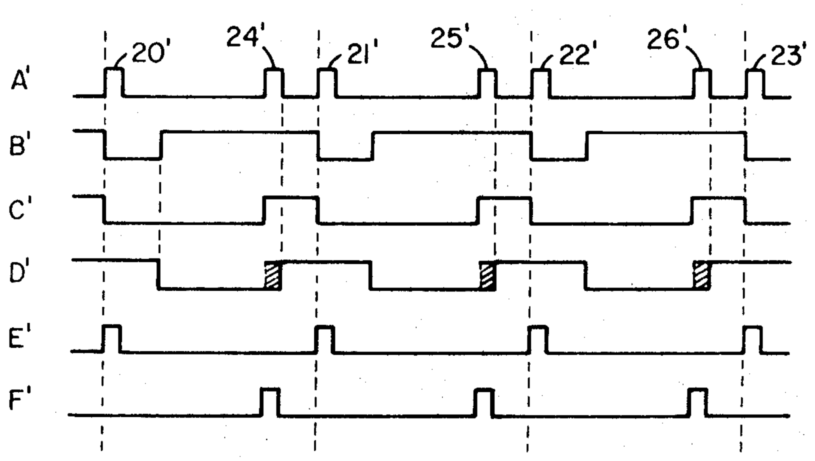

While the foregoing may represent the principal purpose of the present invention, other objects and features thereof will become apparent upon careful consideration of the following specification and drawings in which FIG. 1 is a block diagram of a preferred embodiment of the invention; and FIGS. 2 and 3 show a series of waveforms useful in explaining the operation of the present invention.

Referring now to FIG. 1, there is shown at 9 an input data line to which the incoming signal pulse train is applied. In practice this line may correspond to the output line from the signal-shaping circuits of a magnetic recovery system. The input data appearing on line 9 is applied to one input of the two-input AND gate 10 the output from which is applied through a triggerable delay element 16 to the set input of a strobe flip-flop 11. Again in practice, the triggerable delay element 16 may be a one-shot multivibrator which is set by the output of the AND gate 10 and then recovers at some predetermined time later to key the strobe flip-flop 11 to its set condition. The output from AND gate 10 also is applied to a second triggerable delay element 17 (one-shot multivibrator) the output of which is applied through a second two-input AND gate 12 to the reset input of the strobe flip-flop 11. The triggerable delay element 17 has a longer delay than element 16 and it acts upon recovery to reset the strobe flip-flop 11. The reset or $\overline{\text{strobe}}$ output of the strobe flip-flop is connected to the second input of the AND gate 10 and serves to open gate 10 during the reset period of flip-flop 11 (when the $\overline{\text{strobe}}$ line is high) and inhibit gate 10 during the set period of flip-flop 11 (when the $\overline{\text{strobe}}$ line is low). This connection, as will be described, acts to separate the clock pulses from the data pulses and cause the clock pulses appearing on line 18 to trigger the circuit. The second input to the AND gate 12 is derived from the output of an inverter 13 which has its input connected to the input data line 9. The inverter 13 output operates to inhibit gate 12 during the time the data and clock pulses appear on line 9. The input data line 9 is also applied to one input of a third AND gate 14 where the binary "1" bits are separated from the clock pulses. To this end the set, or strobe line output of the strobe flip-flop 11 is applied to the second input of AND gate 14 and acts to open gate 14 during the set period of the flip-flop 11. The output of the AND gate 14 may then be applied to the input of any suitable utilization device 15 such as a shifting register or the like, while the clock pulses appearing on line 18 may be applied to the shift control line of utilization device 15.

Referring now to FIG. 2, the operation of the circuit of FIG. 1 to separate the data and clock pulses from a "double frequency" system will now be described. In the description of FIG. 2 an idealized operation of the system is assumed. In FIG. 2 waveform A represents the input signal information appearing on line 9; waveforms B and C the action of delay elements 16 and 17 respectively; waveform D the $\overline{\text{strobe}}$ output of flip-flop 11, and waveforms E and F the decoded outputs from gates 10 and 14 respectively. Also from waveform A it is further assumed that a string of binary "1's" is to be decoded. Finally, it is further assumed that the strobe flip-flop 11 is initially in a reset condition, which condition can be obtained by initially jamming the flip-flop to its reset condition by means not shown. Also and although not illustrated, it is customary to precede the transmission of the data train (waveform A) with a start-up pattern, which in this case would be a string of 0's. This insures that the strobe flip-flop 11 will be initially triggered by the clock pulses 20, 21 and 22 and that the strobe pulse will be centered about the center of the data cell. In a typical example, the time period of a data cell may be 800 nanoseconds. That is, the time interval between the leading edge of one clock pulse 20, for example, and the next successive clock pulse 21, for example, will be 800 nanoseconds. In this example, a binary " 1" would appear as a pulse whose leading edge is 400 nanoseconds removed from the clock pulse 20. It also may be assumed that in a typical example the duration of each of the clock pulses 20, 21, etc. and the binary "1" pulses 24, 25, etc. is 70 nanoseconds.

The strobe flip-flop 11 having been initially cleared to its reset condition (with the $\overline{\text{strobe}}$ output line high) operates to initially open the gate 10. Thus, upon receipt of the first clock pulse 20 the clock pulse will appear at the output of gate 10 as shown by waveform E. This pulse triggers the delay elements 16 and 17 simultaneously as shown by waveforms B and C to set these delay elements to their unstable condition. At the end of a predetermined delay, which may typically be 200 nanoseconds, the short delay element 16 recovers as shown at 27 in waveform B to set the strobe flip-flop 11 as shown at 28 in waveform D. Setting the strobe flip-flop 11 causes the strobe line to go high to condition gate 14. At the same time the strobe output of flip-flop 11 goes low as shown in waveform D to remove the permissive signal from gate 10 and thus to block the passage of signals through gate 10. At the end of say 600 nanoseconds, the long delay 17 resets as shown at 29 in waveform C. At this time the output of the inverter 13 is high and gate 12 is permissed so that when delay element 17 recovers as shown at 29 (waveform C) the resulting output signal from gate 12 acts to reset the flip-flop 11 as shown at 30 in waveform D. Resetting the flip-flop 11 removes the permissive signal from gate 14 and reconditions gate 10. It will thus be seen that in the time interval between the recovery of element 16 and the recovery of element 17 the strobe flip-flop 11 has been set and gate 14 is rendered operative. Thus during this time any data pulse appearing on the input data line 9 is passed through gate 14 into the utilization device 15. The output from gate 14 is shown by waveform F in FIG. 2.

From the foregoing it will be seen that the intermixed data and clock pulses appearing on line 9 (waveform A) are separated: the clock pulses appear on line 18 and the data pulses appear at the output of gate 14.

The foregoing assumed an idealized condition. This condition, however, does not always prevail in practice. For example, certain pulse patterns or a difference in heads where the information is recorded on one machine and played back on another machine may cause the data bits such as 24, 25, 26, etc. to shift toward the end of the strobe pulse. In some situations the amount of shift may be severe enough for the data pulse itself to shift to a point where it straddles the end of the strobe pulse. Such a situation is shown in FIG. 3 to which reference is now made. In FIG. 3, the waveforms A′, B′, C′, D′, E′ and F′ have the same significance as the corresponding waveforms in FIG. 2 except in the illustrated example the data pattern shown in waveform A′ has been distorted such that the data bits 24′, 25′, 26′ have been shifted to occur at a point say 570 nanoseconds following the clock pulse. In this example, the data pulse has a leading edge which occurs 30 nanoseconds ahead of the nominal end of the strobe and a terminal edge which occurs 40 nanoseconds after the end of the strobe. During the 70 nanosecond data pulse 24′, the output from the inverter 13 is low and gate 12 is prevented from producing an output signal until the end of the data pulse. At this time the output from the inverter 13 goes high and gate 12 then produces a resetting output signal for the flip-flop 11. The effect of this action is shown by the shaded portions in waveform D′. The data pulse thus acts to extend the strobe by an amount proportional to the overhang of the data pulse over the normal end of the strobe pulse. In this way the clock bits and data bits can be successfully recovered. In contrast thereto and without the actions of gate 12 and inverter 13, the delay element 17 (under the conditions assumed in FIG. 3) would normally reset the strobe pulse generator 11 during the occurrence of the data pulse 24′. Such resetting switches the data pulse into the clock line 18 to generate a spurious clock signal which in turn causes a loss of synchronism in the system.

Another type of error which is possible under the conditions assumed in FIG. 3 occurs when the limited-duration data pulse passing through gate 10 triggers delay 16 but not delay 17. In this case the error is fatal to the system since failure to reset the strobe flip-flop 11 would permanently disable gate 10 causing a permanent loss in clock pulses from gate 10. Again the present invention avoids this type of error.

Thus it will be seen that the addition of the gate 12 and the inverter 13 and their interconnection to control the operation of the strobe pulse flip-flop 11 improves the tolerance and reliability of the system to properly respond to the receipt of delayed data pulses.

Although the present invention has been described with respect to a particular mode of information signaling, namely, the double frequency mode, it is believed to be obvious that in its broader concepts the present invention can find equal applicability to other types of signaling systems which include both clock and data pulses. Accordingly, this invention is not to be restricted except insofar as is necessary to meet the spirit of the present disclosure.

The embodiments of the invention in which an exclusive property or privilege is claimed are defined as follows:

1. In a digital data system which includes intermixed data and clock pulses arranged in a serial pulse train, means for separating the clock pulses from the data pulses comprising a two-input AND gate for receiving on one input said serial pulse train, a strobe pulse generator, coupling means coupling the output of said AND gate to said pulse generator, said coupling means comprising a first signal path responsive to a clock pulse output from said AND gate to inaugurate the generation of a strobe pulse and a second signal path responsive to said clock pulse after a delay to terminate the generation of the strobe pulse; means for applying said strobe pulse to the second input of said AND gate to inhibit operation thereof during the presence of said strobe pulse, whereby clock pulses may be derived from the output of said AND gate, the second signal path of said coupling means further including an inhibit means responsive to the input serial pulse train for inhibiting the termination of said strobe pulse during the receipt of a data pulse.

2. A system as set forth in claim 1 wherein said pulse generator is a flip-flop and wherein the first signal path of said coupling means is connected to the set input of said flip-flop and the second signal path of said coupling means is coupled to the reset input of said flip-flop.

3. A system as set forth in claim 2 wherein the second signal path includes a triggerable delay device and an AND gate coupling the output of said delay device to the reset terminal of said flip-flop.

4. A system as set forth in claim 3 wherein an inverter couples the input signal train to the AND gate of said second signal path so as to inhibit said AND gate during receipt of the data pulses.